United States Patent [11] 3,612,819

[72] Inventor David W. Gibson
 Long Beach, Calif.
[21] Appl. No. 866,781
[22] Filed Aug. 14, 1969
[23] Division of Ser. No. 617,187, Feb. 20, 1967, Abandoned
[45] Patented Oct. 12, 1971
[73] Assignee HITCO

[54] APPARATUS FOR PREPARING HIGH MODULUS CARBONACEOUS MATERIALS
 10 Claims, 6 Drawing Figs.
[52] U.S. Cl. .......................................... 219/155
[51] Int. Cl. .......................................... C21d 9/62, H05b 1/00
[50] Field of Search ............................. 219/155; 23/209.1; 264/27, 29

[56] References Cited
UNITED STATES PATENTS
3,313,597 4/1967 Cranch et al. ................ 264/27 X
2,463,412 3/1949 Nachtman ..................... 219/155
2,589,283 3/1952 O'Grady ....................... 219/155
2,894,115 7/1959 Alf ............................... 219/155
3,313,269 4/1967 Hough ......................... 219/155

Primary Examiner—J. V. Truhe
Assistant Examiner—Lawrence A. Rouse
Attorney—Fraser and Bogucki ABSTRACT: Apparatus for strengthening carbonaceous materials comprises at least one pair of electrically conductive electrode rollers, material supply and takeup means and electrode power supply means. The apparatus may also include a pair of preheat rollers and variable speed control means coupled to material supply and takeup means.

FIG.-1

STEP A — PREHEAT NON-CONDUCTIVE CARBON STRAND OR WEB TO CONDUCTIVE

STEP B — CONTINUOUSLY PASS CONDUCTIVE CARBON STRANDS OR WEB OVER ELECTRODES — RESISTIVELY HEAT IN INERT ATMOSPHERE — TO ABOVE 2000°C UP TO 10 SECONDS

STEP C — SIMULTANEOUSLY STRETCH BETWEEN 10% AND 50%

FIG.-2

STEP 1 — PYROLYZE FIBER STRAND MATERIAL TO AT LEAST 310°C

STEP 2 — RESISTIVELY HEAT SHORT CONDUCTIVE STRAND BETWEEN ELECTRODES / RADIANTLY HEAT CONTINUOUSLY PASSING PYROLYZED STRAND WITH HEATED CONDUCTIVE STRAND

STEP 3 — ELECTRICALLY HEAT CONTINUOUSLY PASSING CONDUCTIVE STRAND AT ABOVE 2000°C UP TO 10 SEC.

STEP 4 — SIMULTANEOUSLY EXERT TENSION TO STRETCH FIBER 10% — 50%

INVENTOR.
DAVID W. GIBSON
BY Fraser and Bogucki
ATTORNEYS

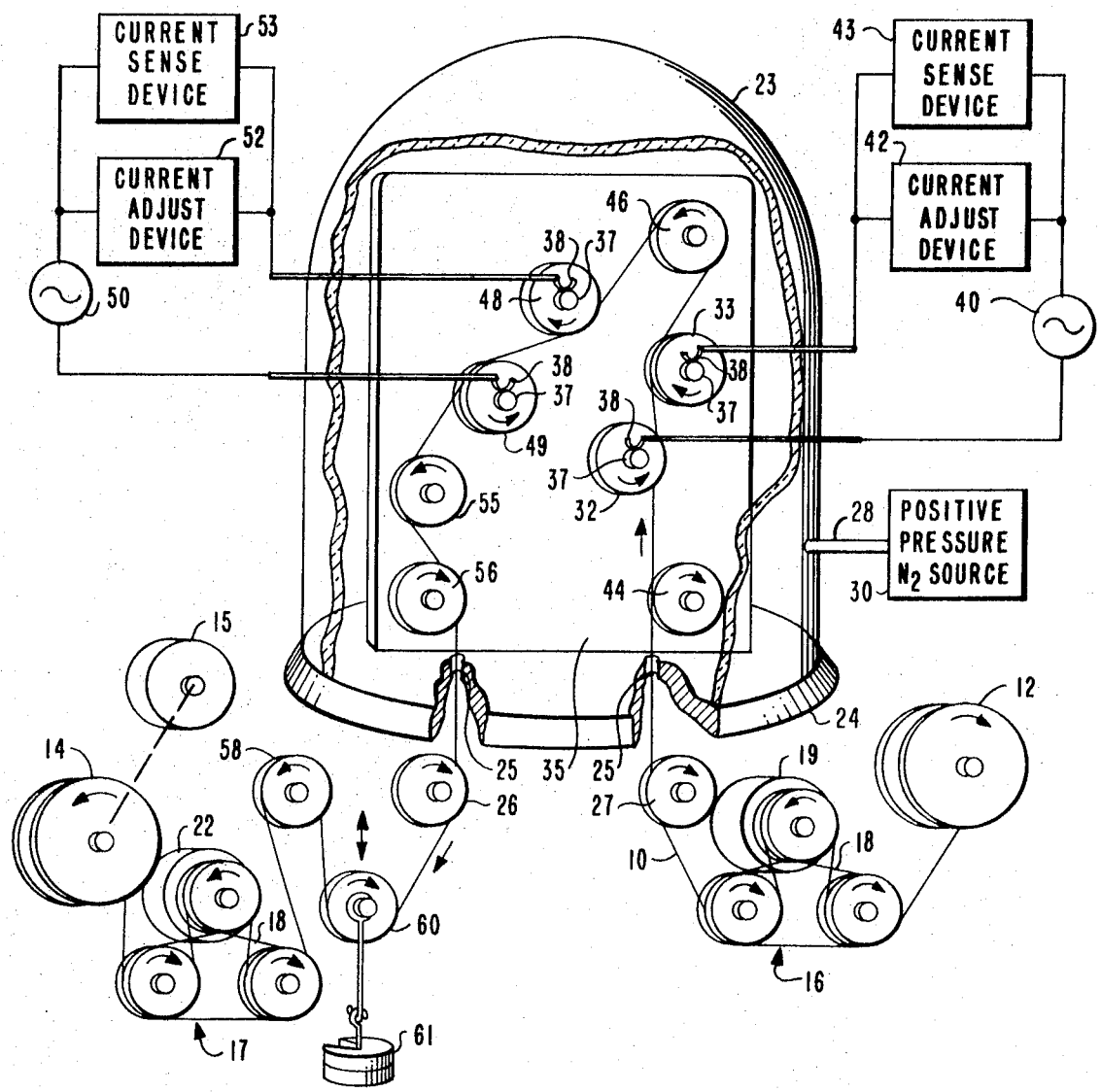
FIG.—3

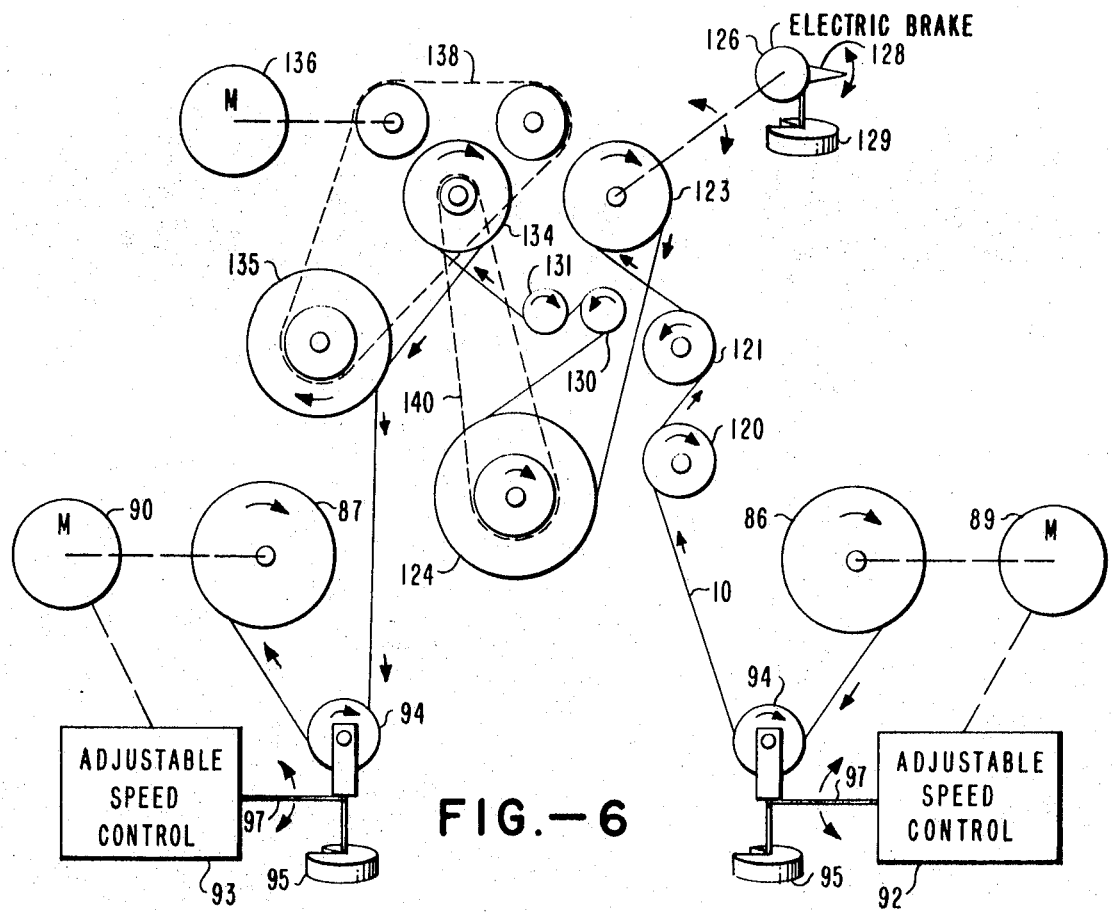
FIG.—6
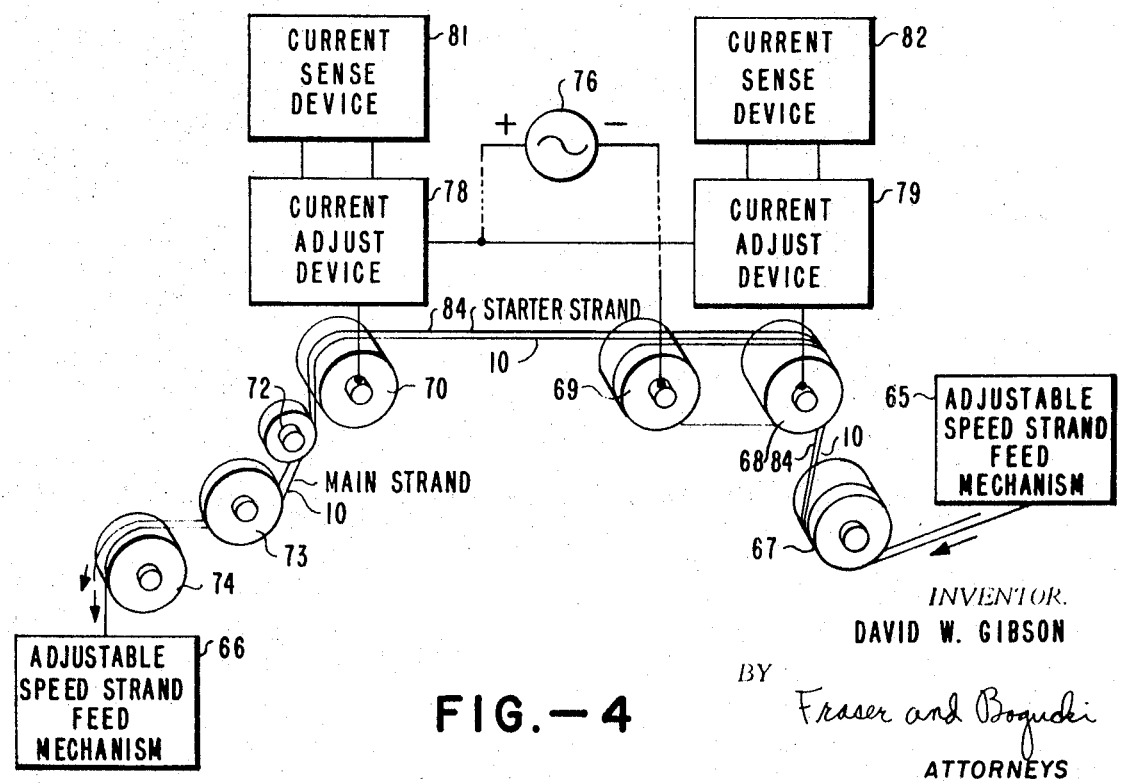
FIG.—4
INVENTOR.
DAVID W. GIBSON
BY
Fraser and Bogucki
ATTORNEYS

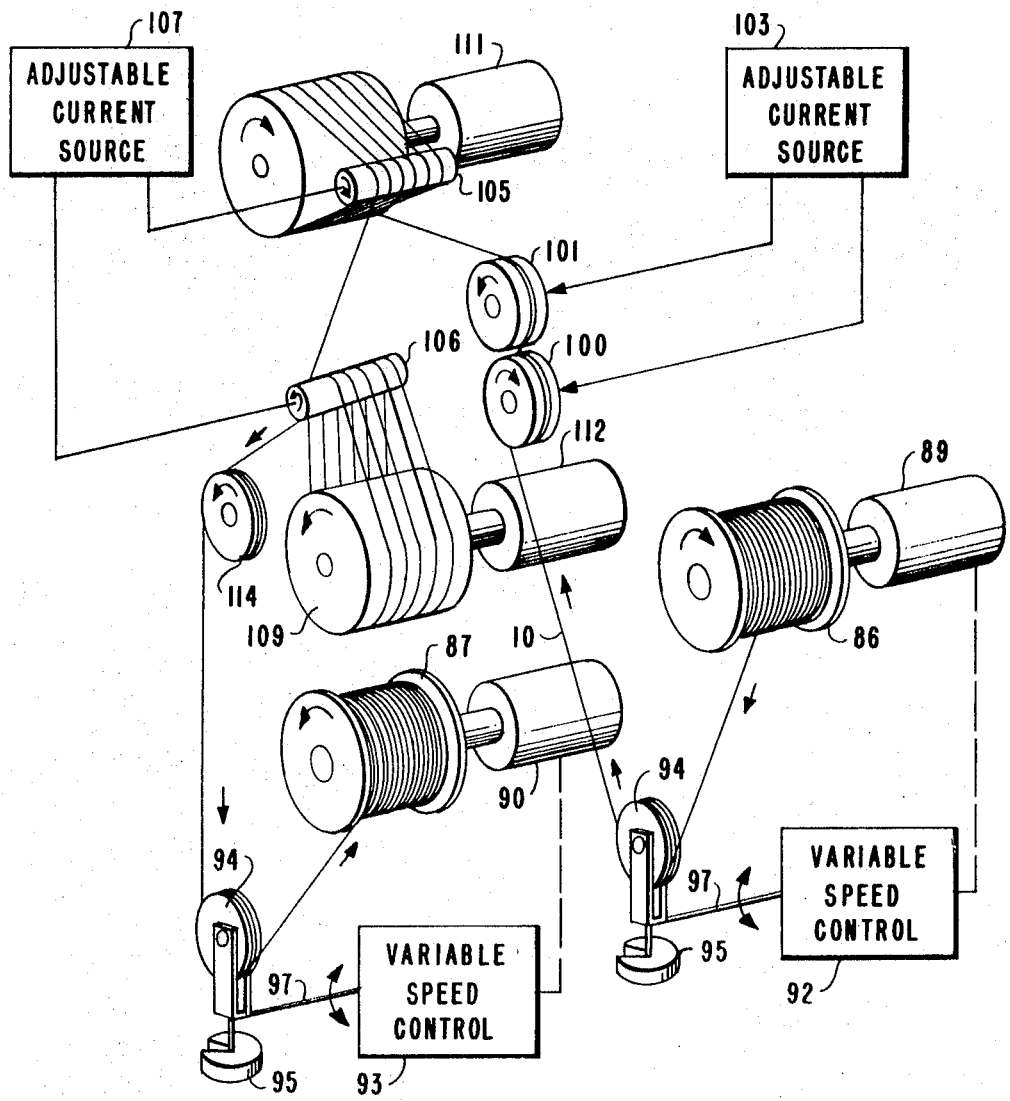
FIG.—5

APPARATUS FOR PREPARING HIGH MODULUS CARBONACEOUS MATERIALS

This application is a division of copending application Ser. No. 617,187, now abandoned, filed Feb. 20, 1967.

BACKGROUND OF THE INVENTION

Carbonaceous fibers have been known for some time to be especially useful for their high-temperature properties. Carbon fibers are quite stable and maintain their integrity at high temperatures under inert atmosphere because of their high-carbon contents. The noncrystalline and crystalline forms of carbon do not melt but ultimately sublime at extremely high temperatures. They have great resistance to thermal shock, and can have various degrees of thermal and electrical conductivity. These factors, together with the chemically inert nature of the fibers has led to their usage in a wide variety of protective insulative and structural applications for severe temperature and corrosive environments.

In preparing carbon fibers, cellulosic materials such as cotton, rayon and the like are heated under controlled conditions at successively elevated temperatures to carbonize the cellulosic structures. Volatile components and compounds are driven off as gases while the basic integrity of the fibers is maintained. Such pyrolysis has been used in preparing carbon and graphite materials in the form of fabrics, tapes, yarns and the like, and is disclosed, for example, in U.S. Pat. No. 3,294,489. One of the major drawbacks of carbonaceous fibers has been that they have been subject to relatively low elastic modulus, strength and substantial nonuniformity. As a result, methods have been sought for increasing the elastic modulus, tensile strength and uniformity of these carbon fibers. High modulus and strength characteristics are necessary where the fibers are to be used in preparing composites, filament windings and the like and especially where the final use of such products is in applications where great variations of temperatures as well as physical forces are to be encountered. Coating of the fibers with synthetic resin materials in order to increase their strength is only of limited utility, inasmuch as the fiber characteristics determine the essential characteristics of the resultant product. Any substantial improvement in the fibers themselves not only can extend the utility of a product using the fibers but permits a corresponding reduction in the size, weight and cost of the product.

It has been found that subjecting the carbon fibers to tension, while at the same time heating the fibers, results in a product which has significantly higher elastic modulus and tensile strength. Methods used heretofore to increase the modulus and tensile strengths of the carbon fibers have comprised heating a strand of the fibers within a furnace at suitable temperatures while at the same time applying stress to stretch the fibers passing through the furnace. Although improved strength properties have been realized from such a method, it has not been altogether satisfactory for a number of reasons. The use of a furnace necessitates induction or radiation heating of the fibers, which result in gradual heating of fiber strands from the outside to the inside. Gradual and nonuniform heating in this fashion is both slow and gives somewhat undependable results because fiber and strand diameters vary due to the characteristics of the initial and pyrolized fibers. In addition, in order to insure thorough heating of the fibers, it is necessary to maintain the fiber within the furnace for a relatively long period of time, i.e. up to as much as approximately 10 minutes or more. The cost of processing is thereby increased, because the dwell time within a furnace must be accomplished either by extending the furnace length or decreasing the feed rate or both. Methods used heretofore have also required preheating or firing of the fibers at temperatures of about 1,000° to 1,200° C. during or following their pyrolysis, in order to attain desired percentages of carbon. It would be generally preferable to attain the desired final properties by processes that are faster, less costly and involve less handling.

A major problem encountered with the heating and stretching techniques heretofore used has been due to the long heating periods necessary to thoroughly heat the fibers. Such slow heating results in the growth of comparatively large crystallites within the fiber materials. Such large crystallites are resistant to orientation by stretching and accordingly reduce the effectiveness of the stretching process. In addition, crystallite size throughout the cross section of the inductively heated strands is not as uniform as would be desirable.

SUMMARY OF THE INVENTION

The present invention provides a method for preparing carbon fiber materials which comprises continuously and resistively electrically heating part of a moving strand or web of carbon fiber which has been pyrolyzed up to a temperature of at least about 310° C. or higher. A current is passed through the strand or web for a relatively short interval, to heat the fibers to about 2,000° C. or higher in order to induce crystallite growth with simultaneous orientation of the crystallites.

In accordance with the invention, tension may be exerted on the strand or web during the time of heating, to stretch the fibers in the strand or web to between about 10 and 50 percent of their original length.

In another form of the invention, fibers may be prepared from initial cellulosic materials by pretreatment to a relatively low temperature by a high-yield process. The fibers of low-carbon content may then be quickly treated by continuously resistively heating the fibers in a first zone in order to effectively raise their carbon contents to above approximately 90 percent. These preheated fibers are then passed directly to a second zone and resistively heated to about 2,000° C. or higher for a very short time in order to induce crystallization and further increase the carbon content. The fibers must be stretched simultaneously in order to substantially increase the elastic modulus and tensile strength of the fibers within a very short period of time.

Mechanisms in accordance with the invention dispose at least one pair of conductive electrodes within an inert environment and pass a strand or web in a path that makes contact with both electrodes. The electrodes are relatively close together, and are conductive, preferably of the roller type, in circuit with a power supply, such that the circuit is completed through the relatively short span of strand or web. Associated roller systems may be disposed on each side of the electrodes to stretch the fibers during heating. In one form, these associated systems may provide a constant force and in another they may provide a constant stretch as a means of applying tension to the yarn.

In accordance with another aspect of the invention, the strand or web may be preheated by a second electrode pair disposed prior to the first electrode pair along the web path. The preheating may advantageously be used to drive off volatiles, or may be employed in a different fashion to substantially increase carbon content and increase electrical conductivity.

BRIEF DESCRIPTION OF THE DRAWINGS

A better understanding of the invention may be had by reference to the following description, taken in conjunction with the accompanying drawings, in which:

FIG. 1 is a block diagram representation of one method in accordance with the invention;

FIG. 2 is a block diagram of different method aspects in accordance with the invention;

FIG. 3 is a simplified perspective, partially broken away, of a first form of apparatus for fabricating carbonaceous materials in accordance with the invention;

FIG. 4 is a combined block diagram and simplified perspective of a different form of apparatus in accordance with the invention;

FIG. 5 is a simplified perspective of yet another apparatus in accordance with the invention; and FIG. 6 is a simplified representation in elevation of yet another apparatus in accordance with the invention.

DETAILED DESCRIPTION OF THE INVENTION

The present invention, referring now to FIG. 1, involves a method comprising heating amorphous carbon-containing strands or webs in an inert atmosphere to a temperature of above about 2,000° C. and preferably between 2,400° C. and 3,200° C. for a time of between up to about 10 seconds and preferably between about one-fiftieth and 10 seconds. This method is shown as step B in FIG. 1. The heating process may be carried on continuously by utilization of an apparatus whereby the carbon fibers are passed over or otherwise contact electrodes in a continuous manner. More specifically, strands or webs of fibers, such as may be present on a reel, spindle, spool or the like, may be continuously passed over or otherwise contact the electrodes which have a sufficient potential thereon to cause the carbon fibers to heat up to the desired temperature. In such a manner, the carbon fiber is heated instantly and uniformly throughout essentially the whole length of the strand that is between the electrodes.

The heating processes as described herein, whereby the fiber strands are electrically heated between electrodes, are carried out in an inert atmosphere. By the term inert atmosphere is meant a gaseous composition, the components of which will not react with or otherwise degradate the fibers. Specifically, a nonoxidizing atmosphere, such as nitrogen, helium, should be used and in such a manner as to eliminate excess volatiles from concentrating in the vicinity of the heating fiber strand. Accordingly, it is preferred to carry out the process within a closed or covered vessel with the inert nitrogen atmosphere being continuously changed so as to remove the volatiles.

The carbon fibers that may be used in the process of the present invention are those which have been pyrolyzed preferably in the presence of an inert atmosphere at temperatures of at least about 310° C. up to about 1,900° C. Such pyrolysis methods are well known in the prior art and result in essentially amorphous carbon fibers having a carbon content of about 70 percent or higher, up to about 99 percent. These amorphous fibers are also characterized by having a tensile strength of between about 20,000 and 60,000 p.s.i. and a modulus of between about $3\times10^6$ and $7\times10^6$ p.s.i. As used herein, the term "modulus" means Young's modulus, or the modulus of elasticity of a fiber as understood by those skilled in the art.

The carbon fibers may be those prepared from cellulosic or other materials that yield carbonaceous fibers when pyrolyzed, such as polyacrylonitrile, polyvinyl chloride and the like.

Since one aspect of the invention comprises heating a carbon fiber strand resistively and electrically (FIG. 1, step B), it will be appreciated that in order to accomplish this, the fiber strand must be adequately electrically conductive. Carbon is semiconductive in its nature, and carbonaceous materials vary from essentially dielectric characteristics to relatively low electrical resistivity as carbon content is brought from below about 70 percent to above about 90 percent to 99 percent by heating at the elevated temperatures. The length of residence time at temperature also has some effect on electrical conductivity. Thus, carbon fibers that have been pyrolyzed at temperatures up to about 350° C. do not generally have sufficiently high-carbon content or electrical conductivity to be used in step B of FIG. 1.

Carbon fibers which have been previously processed at temperatures between about 400° to 1,900° C. and have carbon contents above about 85 percent are electrically conductive enough to treat directly according to step B. However, one of the significant aspects of the present invention is the provision of a continuous preheating step or firing step by which the pyrolyzed strands or webs are heated at temperatures above about 400° C. up to about 1,900° C. just prior to the high-temperature treatment. In this temperature range, the pyrolyzed amorphous carbon fiber strand is increased in carbon content but without significant increase in crystallite size. The continuous preheating step removes volatiles and noncarbon materials thereby improving the overall quality of the fibers as well as increasing their electrical conductivity. This preheating step involves heating a short fiber strand to a temperature between about 400° C. and 1,900° C.—step A, FIG. 1. Even where the carbon fiber strand to be high-temperature treated is already electrically conductive, if it has a carbon content below about 95 percent it is often desirable to preheat it according to step A at temperatures between about 800°–1,900° C. to further remove volatiles and improve fiber quality just prior to step B. Such a combination of steps A and B allows relatively inexpensive low-carbon fibers to be rapidly and continuously processed to provide superior fibers as the end product.

It is believed, although the invention is not limited to the theory, that the heating step B (FIG. 1), whereby the carbon fibers are electrically heated to above about 2,000° C. and preferably between about 2,400° C. and 3,200° C. for a short time, causes crystallites to form in the amorphous carbon fibers. The higher the temperature and the longer the heating time, the larger the crystallite size. In addition, in this temperature range, if the fiber is subjected to tension, it stretches, aligning the crystallites to further increase the modulus and tensile strength as shown in step C, FIG. 1. It is important that the high-temperature-heating step be carried out for a time only sufficient to allow orientation and crystallite growth to be optimized. Times of between about one-fiftieth and about 10 seconds are sufficient at these temperatures. The high-temperature heating improves the uniformity in physical characteristics, and further volatilizes and eliminates noncarbonaceous residues. While a true graphitic structure does not result, a substantial degree of crystallinity appears to be present within the fibers.

Pyrolyzed carbon fibers that have independently been fired at sufficient temperatures, such as disclosed in U.S. Pat. No. 3,294,489, and which do not have a surface coating may be treated by short span electrical resistance heating to above 2,000° C. directly as shown in FIG. 1, step B, without any preheating as described above. Such fibers are those which have been fired at temperatures between about 800° and 1,900° C. generally by utilizing furnaces and inert atmospheres and contain carbon contents above about 90 percent and, although electrically conductive, they are essentially amorphous.

Coating materials may be used in order to reduce the friction of the fiber strand passing through the process and to substantially eliminate abrasion of the strands as they enter into the system. The coatings may comprise suitable polymeric materials which do not otherwise inhibit or affect the process. Suitable polymers include fluoroethylene polymers, such as polytetrafluoroethylene (Teflon) and its copolymers, and high-molecular-weight polyethers, such as polyethylene glycols, etc. Strand and web materials may be coated with the polymers anytime prior to introduction into the process of the invention. These coating materials may also be used to protect the finished strands or webs upon completion of the process described above.

Carbon fiber filaments, strands and webs that may be utilized to advantage in the process of the present invention are prepared by carbonizing a fibrous cellulosic material which has been impregnated with a hydrate-forming hygroscopic halide and thereafter carbonized at a temperature at least about 315° C. Such fibers and methods of preparing them are disclosed in copending U.S. application Ser. No. 517,951, filed Jan. 3, 1966, assigned to the assignee of the present invention. Methods in accordance with the present invention employ this carbonization step to derive superior carbon fibers which have extremely high and uniform modulus and tensile strengths. Such carbon fibers have outstanding properties for some purposes because they approach the theoretical maximum in carbon yield, thereby decreasing the residues which accumulate in the heat-treating apparatus. Such fibers may be both preheated according to step A and high-temperature heated according to step B.

The length of the short-span electrical resistance heating depends upon the speed of the strand or web, the voltage applied, and the heating period desired. Heating temperature is regulated by varying the current passed through the carbon fibers. However, it is preferred to use a strand or web span of between about one-fourth and about 6 inches and preferably about one-half and about 2 inches. Suitable driving rates for the strands or webs are of between about 2 and about 50 feet per minute and preferably between about 5 and 40 feet per minute. At such process rates, the overall heating time of any given point on the short-heated span is between about one-fiftieth and about 10 seconds. The times involved in the process of this invention are significantly shorter than times utilized heretofore either to fire carbon fibers or heat and stretch the fibers to prepare high-modulus and high-tensile strength materials.

Although the invention has been generally described as heating single strands or portions of the carbonaceous strands or webs, it should be appreciated that one or more spans may be used in each heating phase. Accordingly, the pyrolyzed fiber material may be preheated at temperatures up to about 1,900° C. in one or more stages, for example, between two or more electrodes. Additionally, more than one strand may be processed in the same apparatus at one time. Such a plurality of spans, electrodes and strands may also be utilized in the high temperature and stretching steps. It will be appreciated that the process rates and heating times are applicable to both the preheating and high-temperature aspects of the invention as described, and as will be shown in more detail herein.

According to the invention, in preparing carbon fiber products having high modulus and a tensile strength as disclosed herein, tension is placed on the strand or web as it is heated above about 2,000° C. as shown in step C of FIG. 1, in order to stretch the fibers. The stretching may be effected by any appropriate means, including introducing a constant force on the strand or web as it is being heated. Although this method is acceptable for many purposes, individual fibers are not uniformly stretched, if, as is typically the case, strand increments being passed through the high-temperature range varies. Thus, where a portion of the fiber strand is weaker at a particular temperature than another portion of the strand, that portion is stretched to a greater extent than a stronger portion under a constant force. Accordingly, such a method of stretching gives a final product having greatly improved modulus and tensile strength overall but also nonuniform to a degree depending on the variances in the strand or web passing through the process. In many applications, part configurations are such that variations between strands or between portions of a single strand may not be detrimental, even though quite significant in terms or percentage. However, in other configurations, weak points are much more critical and variations in strength cannot fall below a selected minimum.

Another method by which the fibers may be stretched according to the instant process, achieves a substantially constant stretch and a more uniform product than the constant force technique. In using the constant stretch method, the degree of stretch is more independent of fiber strength and the specific temperature above that required for any specific stretch and which is being utilized in the heating step. In fact, use of a constant percent stretch tends to compensate for the varying temperature ranges and strand sizes resulting from variations in the conductivity and cross section of the strand. Accordingly, where such a constant stretch technique is used on the carbon fiber strands, substantial improvement in modulus and fiber strengths will be realized. In addition, the constant stretch method substantially reduces strand or web breakage, because weaker lengths are no longer attenuated after being stretched a given amount.

Significant advantages derive from the process of the present invention in essentially instantaneously heating the continuously moving carbon strands at high temperatures for very short intervals while concurrently stretching. The heating starts crystallite growth while stretching orients the growing crystallites. The process offers significant advantages over previous methods by which the fiber strands were heated for one-half minute up to about 10 minutes. Where those long times of heating are utilized, such as set forth in application Ser. No. 580,187, filed Sept. 10, 1966, crystallite structures grow to such a significant size that stretching performed during the heating was not as effective due both to the size of the crystallites as well as their nonuniform distribution throughout the fiber strand. The nonuniformity of fibers produced by such a process is due in part to the face that in a system where the carbon fiber strand is heated within a furnace or other radiant-type heating means, the outside of the fiber strand becomes heated for a longer period of time and at greater temperatures than the inside of the strand. Since crystallite growth is due, at least in part, to the temperature at which the carbon is brought, as well as the time that temperature is maintained, and since the diameter of the fiber strand will vary from point to point, crystallite distribution throughout both the length and the cross section of the fiber strand will be nonuniform and random. It also follows that crystallite size will be greater toward the outside fibers of the strand than at the center. On the other hand, the short instantaneous heating times utilized in the present invention allow crystallites to form uniformly throughout the fibers and the strand because of the uniform heating throughout the cross section of the strand. Crystallite sizes will be relatively small due to the short heating time which allows for relative ease in stretching and concomitant crystallite orientation.

When a nonconductive fiber strand is to be processed according to the invention, the preheating step may be accomplished by radiation heating the fiber strand by having alongside the nonconducting strand and in intimate contact a conductive strand that is heated to a temperature high enough so that the adjacent nonconductive strand will be more completely carbonized and itself become conductive. One pass of a nonconductive strand portion passing along side a conductive strand portion having a temperature of above about 1,200° C. will be sufficient. Initially when starting a nonconductive strand through the process, it will be necessary to pass a short span of conductive strand adjacent to the nonconductive strand whereby the conductive strand will become heated. Once a portion of the nonconductive strand becomes conductive, it will be hot enough to radiantly induce heating to the freshly arriving adjacent nonconductive strand portion, thereby radiantly heating it to such an extent as to become conductive and so on in a continuous manner. Thus, once a strand portion has become conducting, the use of the conductive starting fiber which was used to initiate the process may be dispensed with.

The high-modulus carbon fibers prepared by the instant invention are those having a modulus of between about $20\times10^6$ and $70\times10^6$ p.s.i. and a tensile strength usually between about 130,000 and 400,000 p.s.i. In order to obtain strengths of this order from amorphous nonconductive carbon fibers which have moduli of between about $3\times10^6$ and about $7\times10^6$ p.s.i. and tensile strength of between about 20,000 and 60,000 p.s.i. stretching of between about 10 and 50 percent and more, preferably about 25 and 40 percent, should be utilized at the temperatures above about 2,400° C. It is important that carbonaceous strands have a suitable balance between elastic modulus and tensile strength since a great imbalance of one or the other indicates a fibrous material that is either too brittle or too elastic. The advantage of the preferred carbon fiber strands and webs prepared by this invention is that the ratio of elastic modulus to the tensile strength $\times 10^2$ is less than 2.0 which indicates a very satisfactory product. More specifically, the tensile strength is at least 0.5 percent of elastic modulus.

In a number of actual examples, carried 41according to the process of the invention, carbon fiber strands were heated to about 2,900° C. resistively for 0.4 seconds calculated on a rate of 20 feet/minute and an electrode space of 1.5 inches in a continuous process under strain whereby the strand fibers were stretched about 40 percent. The resulting strands (11 samples) possessed average tensile strength of about 179,000 p.s.i. and moduli of between $25 \times 10^6$ and $41 \times 10^6$ p.s.i. (average $32.2 \times 10^6$ p.s.i.). The starting strand material had an average tensile strength of 40,000 p.s.i. and an average modulus of $5 \times 10^6$ p.s.i.

When a constant force method of stretching is used, the amount of weight necessary to stretch a given strand of carbon fiber at suitable temperatures may be readily ascertained by one skilled in the art. In a similar manner, where a constant stretch or method is used, the variation in the takeup speed as opposed to the input speed of the carbon fiber strand in order to obtain such stretching may also be readily ascertained. It should be realized that the specific increase in modulus and tensile strength will depend to a major degree on the amount of stretching the fiber strand is subjected to which in turn will be limited by the rapidity and temperature to which the strands were subjected in the high-temperature-heating process. Optimum conditions for different sizes and types of fiber strands or webs may vary and can thus be varied to produce a strength desired for a particular end use for which the product will serve.

Even where the fibers are not stretched simultaneously with the high-temperature electrical heating step, product improvements are obtained. In a number of actual examples, carbon fiber strands were inductively heated in a furnace at 2,400° C. for about 1 hour. The resulting strands possessed average tensile strength of 81,000 p.s.i. and an average modulus of $5.3 \times 10^6$ p.s.i. On the other hand, the same carbon fiber strands resistively heated at about 2,400° C. for between about one-half and 10 seconds, according to the invention, possessed an average tensile strength of 110,000 p.s.i. and an average modulus of $11.4 \times 10^6$ p.s.i.

A fully integrated method of treating carbon strand materials in order to achieve uniform high-modulus and high-tensile fibers is shown in FIG. 2. According to the process features set forth above and as shown in that drawing, a fiber strand or web is pyrolyzed at temperatures up to at least 310° C. in an inert atmosphere (step 1). The pyrolyzed fiber strand is then preheated at temperatures between about 800° to 1,900° C. to further remove volatile materials. Where the pyrolyzed strand is electrically conductive, it may be resistively heated between electrodes to between about 800° and 1900° C. (step 2) and thereafter directly passed to the high-temperature heating of step 3. Where the pyrolyzed fiber strand is not sufficiently conductive, it is radiantly heated by the adjacent and resistively heated strand portion to temperature between about 800° and 1,900° C. whereby that nonconductive strand portion is rendered conductive. Thereafter, the preheated strand is resistively and continuously heated to above 2,000° C. for up to about 10 seconds (step 3). The fiber is simultaneously stretched to between 10 and 50 percent whereby the forming crystallites become oriented and the strength of the fiber strand is increased (step 4).

Strand- and web-processing apparatus in accordance with the invention may take a variety of different forms, inasmuch as they may be varied in particular details to provide different characteristics for different types of products being operated upon. For example, it may be desired to optimize physical characteristics, or to optimize production rates while providing improved but not optimum production rates while providing improved but not optimum physical characteristics. The state of the starting material provided is significant, inasmuch as the starting material may have the greater lesser percentage of carbon, dependent upon the prior treatment. Generally, the material being processed will be in strand form, the term "strand" applying generally to filaments, yarns, cordage and the like. It is also feasible, however, to process web materials, including tape, sleeving and similar forms. Various mechanisms and apparatus are illustrated and described for different purposes, but it will be appreciated that these are provided by way of example only and that a number of modifications and variations may be made in accordance with the inventive concept.

The strand or web mechanism of FIG. 3 may be referred to as a constant force system for processing carbonaceous materials. The carbonaceous material 10, here illustrated in strand form, is provided from a supply reel 12 and passed through the system to a takeup reel 14. The supply and takeup reels 12, 14 are isolated from the remainder of the system, in the sense that they are not utilized to introduce or adjust forces along the strand 10. Thus, the supply reel 12 may simply be rotatable mounted and subjected to a light frictional force for braking purposes, while the takeup reel 14 is driven by a motor 15 exerting a light constant torque, to take up the strand 10 uniformly as it is passed through the system. Mechanical isolation of the reels 12, 14 from the remainder of the system is assured by drive-pulley clusters 16, 17 each comprising a set of three closely disposed drive pulleys through which the strand 10 is passed in a tortuous path. The first drive-pulley cluster 16 is adjacent the supply reel 12, and each of the drive pulleys is driven through a conventional drive belt 18 by a variable speed motor 19 which is adjusted to pass the strand 10 at a selected supply speed. The second drive-pulley cluster 17 is similarly driven through a drive belt 21 from a variable speed motor 22 that may be adjusted to a suitably related takeup speed. The high wraparound angle about the individual pulleys, and the relatively long length of contact surface with the pulleys, distributes the forces acting on the strand 10 so that transient force variations are absorbed and point loading forces are avoided.

The strand 10 is guided into and out of a substantially closed inert atmosphere environment, shown generally as a bell jar housing 23 on a base 24 through small low-friction apertured guides 25 and a pair of appropriately disposed guide idlers 26, 27. A conduit 28 in the housing 23 is coupled to a positive pressure nitrogen source 30 to purge the closed environment of oxygen and maintain an inert atmosphere within the housing 23.

Two separate electrode roller pairs are disposed along the path of strand 10 movement. A preheat electrode roller pair 32, 33 is disposed on the upstream side of the strand 10, each of the preheat electrode rollers 32 and 33 being rotatably mounted on a support element here shown as a panel 35. The preheat electrode rollers 32, 33 are made of a highly electrically conductive material, such as copper, although they may also be fabricated of brass, aluminum, graphite or other similar materials, For each electrode roller, a conductive slipring 37 and an engaging stationary brush 38 or other contact element provides external connection through appropriate conductors to an external power source 40 here shown as an alternating current source.

The electrical circuit between the electrode rollers 32, 33 is completed through the strand 10, and passes through a current adjust device 42, such as an adjustable resistor, transformer or potentiometer in series with the power source 40. The amount of power applied is measured by a current sense means 43, such as a conventional ammeter. An alternating current source need not be employed, but for most purposes it will be found that a conventional 100-volt 60-cycle outlet provides adequate power levels for the purposes to be described below. A direct current source may also be used effectively for the process as described. A relatively small but adequate wrap angle about the preheat electrode rollers 32, 33 is maintained by a guide idler 44 within the bell jar housing 23 adjacent the aperture guide 25 in the base 24, and by a turnaround idler 46 about which the strand 10 turns in passing to an adjacent pair of high-temperature electrode rollers 48, 49. As is described in conjunction with the preheat electrode rollers 32, 33, the high-temperature electrode rollers 48, 49 are each of a conductive material, and are in electrical circuit with an AC power source 50 via couplings made through conductive sliprings 37 and contact elements 38.

As previously described, the high-temperature circuit includes the strand 10 and a current adjust device 52 in series with the individual electrode rollers 48, 49 and the power source 50. A separate current sense device 53 is used for this circuit. From the high-temperature electrode roller pair 48, 49 the strand 10 passes out of the bell jar housing 23 around a pair of idler rollers 55, 56 and past the exit guide idler 26.

A selected tension along the length of the strand 10 is maintained by a mechanical biasing system between the exit guide idler 26 and the second drive-pulley cluster 17. This system conveniently includes a turnaround idler 58 mounted in fixed relation to the system, and a vertically movable mechanically biased idler 60, arranged as a freely rotatable member from which an adjustable weight 61 hangs in dependent relation. The weight 61 introduces a controlled tension force on the strand 10, and this force is exerted along the length of the strand 10 within the bell jar housing 23.

In the operation of the system of FIG. 3, a selected speed differential is maintained between the first and second drive-pulley clusters 16, 17 with the second drive-pulley cluster 17, being at a sufficiently higher speed to take up the stretched strand 10 material passed through the system. Thus, the strand 10 is withdrawn from the frictionally braked supply reel 12, fed into the bell jar housing 23 and withdrawn after treatment including stretching, for winding about the takeup reel 14. The positive pressure nitrogen source 30 maintains an inert atmosphere within the bell jar housing 23, and the strand 10 is passed through the housing 23 under a selected tension due to the action of the weight 61.

Strand material 10 provided from the supply reel 12 has a high percentage of amorphous carbon. Typically, the strand material comprises a yarn produced by a pyrolysis process from a starting rayon material and carried to a temperature at which there is in excess of 70 to 80 percent carbon. This material has a low electrical resistivity although the resistivity is substantially further reduced by treating the strand at higher temperatures. For increasing the strength for processing purposes, in reducing the problems of abrasion and wear, the strand 10 may be coated with a suitable low-friction material such as a sizing or Teflon. Organic or inorganic coating materials of this type are preferably removed through the use of the preheat electrode roller pair 32, 33. The current passing through the strand 10, and consequently the strand temperature is adjusted by varying the current adjust device 42 to bring the short span of strand 10 between the preheat electrode rollers 32, 33 to a temperature in the range from 800° C. to 1,900° C. Through the preheat action, the surface materials are effectively completely eliminated by decomposition, and the electrical resistivity is further reduced as the carbon content is increased.

The cleaned strand 10 is then passed, under tension as described, between the high-temperature electrode rollers 48, 49. Here sufficient current is passed through the strand 10 to cause it to be brought to a substantially higher temperature, e.g. 2,000° C. or more. This arrangement provides virtually instantaneous short-span heating under tension that is found to impart the desired elastic and tensile strength properties to the strand. With a relatively small spacing between the electrode rollers 48, 49, such as 1.5 inches, and with a rate of travel of approximately 25 feet per minute, the length of strand 10 in the critical operative region is brought to temperature, stressed and cooled within an extremely short time interval, such as 0.3 seconds or less. Thus, in an elemental length of the strand 10, the entire thickness of the strand 10 is heated, inducing crystallite growth while also rendering the crystallites mobile. The applied tensile forces concurrently stretch the strand 10 and tend to align the crystallites. This stretching is in the range of up to approximately 50 percent although the stretching may be further extended under appropriate conditions as described below. Virtually any stretching is useful, however, for increasing strength and modulus properties.

It should be noted that the short-span resistive heating in this fashion has at least several significant effects. All fibers in a strand or web are substantially equally heated, because even if not in direct contact with the electrodes they are in intimate contact with each other and receive current, and because they are also radiantly heated by adjacent fibers. An extremely high temperature gradient exists at both ends of the short span, the temperature of the strand increasing from essentially ambient level to full temperature within a fraction of an inch, and decreasing at the opposite end of the span. Practically the full intermediate portion of the strand is at the desired temperature, which not only is very high but also is substantially uniform and readily controlled. The thermal shock involved in heating the fibers at rates far in excess of 2,000° C. within a time as short as about one-fiftieth of a second has no adverse effects on the carbonaceous fibers.

The mechanism of FIG. 4 utilizes short-span heating of a carbonaceous material under tension, but achieves a number of particular advantages which are in some respects different from those of the arrangement of FIG. 3. In the arrangement of FIG. 4, the mechanisms for providing an inert environment are not shown, for brevity and clarity of representation. Likewise, the strand feeding and takeup mechanisms are not shown in detail. The arrangement shown in FIG. 4 could utilize either constant force or constant stretch techniques, the strand being supplied from an adjustable speed strand takeup mechanism 66, with an appropriate speed differential being used to elongate the strand 10 during processing under steady state conditions. Under startup conditions, a form of constant force arrangement may be employed by temporarily interposing a weighted pulley in the strand takeup system, in the fashion described in conjunction with FIG. 3.

The strand 10 being processed, here referred to as the main strand 10, is passed in this arrangement to a set of three roller electrodes 68, 69, 70 from an entry idler pulley 67, and is guided away from the electrodes 68, 69, 70 in an appropriate path through a set of three exit idler pulleys 72, 73, 74. The three roller electrodes 68, 69, 70 are of a suitable conductive material and have appropriate electrical power connections to an external source 76, these connections being illustrated only schematically for simplicity. It is advantageous, although not necessary, to dispose the electrodes 68, 69, 70 in approximately inline relationship, with a center-to-center spacing that is relatively short, such as approximately 2.5 inches for the first electrode pair 68, 69 and approximately 1.5 inches for the second and third roller electrodes 69, 70. The circuit connections to the alternating current source 76 are made such that the center electrode 69 is at the opposite potential from the two terminal electrodes 68, 70. Thus, two separate power circuits exist in which current levels are varied through use of separate current adjust devices 78, 79 and indicated by separate current sense devices 81, 82.

The main strand 10 being processed is passed around the first and second roller electrodes 68, 69 at least once to form a complete loop. The number of loops formed about the first and second roller electrodes 68, 69 may be greater and if desired these roller electrodes 68, 69 may be axially displaced relative to each other so as to guide the strand 10 along predetermined different paths as it moves through the consecutive turns. The main strand 10 is then passed off the first and second roller electrodes 68, 69 and across the third roller electrode 70 to the exit idler pulleys 72-74.

In conjunction with this arrangement, a starter strand 84 may also be employed, and passed along the strand path continuously with the main strand 10. The starter strand 84 is shown as separate, but actually may be in contact with the main strand 10 throughout the system, except for winding the main strand 10 through the system, except for winding about the supply and takeup reels. The starter strand 84 may also be looped about the first and second roller electrodes 68, 69 a number of times for better contact.

The mechanism of FIG. 4 is utilized in conjunction with an initial pyrolysis operation to provide the final steps in the manufacture of high-strength, uniform carbonaceous materials. Through its use, the material of the main strand 10 can compromise a high-yield material resulting from the use of initial pyrolyzing steps in the process described in U.S. Pat. application Ser. No. 517,951, filed Jan. 3, 1966. However, the heat treatment described in conjunction with that process may be terminated in the range of 350° C. to 500° C. and after relatively short heating times. Heretofore, a disadvantage of the high-yield technique has been considered to be that the ultimately processed fibers are relatively weak and brittle. In accordance with the present invention, however, the high-yield and economically produced fibers are converted to high-strength fibers when the carbonizing process is completed by apparatus such as shown in FIG. 4.

After the initial steps of a pyrolysis are terminated at approximately 350° C., the fibers have not been treated for sufficient time or at a sufficient temperature to render them substantially electrically conductive. The carbon content is approximately 70 percent in the material being fed into the apparatus. While the carbon content may be somewhat higher than 70 percent (as determined by spectrographic and chemical analysis), it nonetheless will not have a substantial electrical conductivity. Therefore, the potential difference between the first and second roller electrodes 68, 69 passes only minute current insufficient to heat the main strand 10 when power is applied. The starter strand 84, however, comprises an electrically conductive high-carbon material, and thus is heated to a level at which it emits substantial radiant energy, typically 1,000° C. or greater. The heated starter strand 84 in turn heats the main strand 10 by radiation within a few seconds after power is supplied. An increase in temperature in the main strand 10 results to decrease markedly the resistivity of the carbonaceous material in the main strand 10. Consequently, the main strand 10 becomes adequately conductive for the resistive heating to remain continuously effective thereafter, and the starter strand 84 may be removed.

Dependent upon the number of loops formed about the first and second roller electrodes 68, 69, a number of lengths of the main strand 10 (generally only two in number) are heated. This heating provides the equivalent of a flash firing or final pyrolysis-heating step that effectively completes the pyrolysis of the fibers and brings the carbon content to in excess of 90 percent while substantially reducing the resistivity. Immediately thereafter, the fibers in the main strand 10 are subjected to the second short-span heating between the second and third roller electrodes 69, 70. In the second short span, the temperature is brought to in excess of 2,000° C. by appropriate setting of the current adjust device 78. A constant stretch induced in the strand 10 while at temperature, due to the differential speed between the feed and takeup mechanisms 65, 66 imparts the desired strength properties, as previously described.

In the arrangement of FIG. 5, a constant strain or constant stretch mechanism is shown that improves the uniformity of the resultant product and decreases the amount of strand breakage. A strand supply reel 86 and a strand takeup reel 87 is driven at differential speeds by separate variable speed motors 89, 90, each controlled by a variable speed control 92, 93 responsive to the rate at which the strand 10 is withdrawn or supplied. Each speed control arrangement includes a freely rotating pulley 94 from which a weight 95 depends, with the pulley mechanism being coupled to a rotatable arm 97 operating the particular motor speed control 92 or 93. The speeds of the supply and takeup reel motors 89, 90 are varied so as to tend to maintain the pulley 94 positions constant, and the strand 10 movement is controlled by drive drums as described below.

In this arrangement, two short-span heating devices are used. As before, these devices are maintained within an inert environment that has not been illustrated for simplicity. A pair of preheat roller electrodes 100, 101 are disposed on the entry side of the strand. An adjustable current source 103 for the preheat electrodes 100, 101 are adjusted to supply current sufficient to preheat the intermediate short length of strand to approximately 800° C. The preheating serves to decompose surface coatings as well as to further increase electrical conductivity.

The principal electrodes for the apparatus of FIG. 5 comprise a pair of roller electrode rods 105, 106 which are not parallel but are slightly canted to provide a form of Godet drive. Different ones of a pair of drive drums 108, 108 are disposed adjacent a different one of the main electrodes 105, 106. The strand 10 is looped a number of times about each electrode rod 105 and 106 and its associated drive drum 108 or 109 with the slight canting of the electrode rods separating adjacent loops from each other. The first drive drum 108 along the tape path is driven at a selected rate by an adjustable speed motor 111, and the second drive roller is also driven at a selected rate, but at a selected higher speed, by a second adjustable speed motor 112. After leaving the second electrode rod 106, the strand 10 passes across an exit guide pulley 114 to the takeup system.

After preheating, the short span of stand 10 between the electrode rods 105, 106 carries a high-intensity current while a substantially constant stretch is introduced into the strand 10. The relatively large diameters of the drive drums 108, 109 and the constant speed differential between them, insure uniform stretch without undesirable point force loading. Nonuniformities in the strand 10 are difficult to avoid when carbonaceous materials are provided by the pyrolysis technique. With the constant stretch technique, however, thinner or weaker points are not stressed to the breaking point.

A different form of constant stretch system is shown in FIG. 6. As in the system of FIG. 5, the supply and takeup reels 86, 87 are separately driven by motor controls 92, 93 that are set to tend to maintain the positions of weighted pulleys 94 constant. On the entry side, the strand 10 is passed between a pair of preheat roller electrodes 120, 121 and around each of a successive pair of drums 123, 124 in a path forming a substantial wraparound angle about the drums 123, 124. The first drive drum 123 is freely rotatable but coupled to an electric brake mechanism 126 restrained by a lever arm 128. The strand 10 is passed about the second drive drum 124, then between principal roller electrodes 130, 131 and around third and fourth drive drums 134, 135. The second, third and fourth drive drums 124, 134, 135 are driven from a motor 136 through separate belt drives 138, 140, with a selected speed differential being maintained between the second drum 124 and the third drum 134. The belt drives 138 and 140 may be of chain link or pulley belt type.

The speed differential between the second and third drive drums 124, 134 during the principal heating of the strand 10 provides the desired constant elongation of the strand. Control of the strand 10 rate depends only upon adjustment of the breaking effort applied to the roll 123 by the electric brake 126. In the event that slippage over the drive drum 124 occurs, the electric brake 126 is operated to provide a braking force on the strand 10 and increase the friction force of the strand on the drum 124, forcing the strand 10 to maintain the speed of the drive drum 124.

While there have been described above and illustrated in the drawings various methods and apparatus in accordance with the invention, it will be appreciated that the invention is not limited thereto, but encompasses all modifications and variations falling within the scope of the appended claims.

1. Apparatus for strengthening carbonaceous materials in the form of strands or webs comprising: material supply and takeup means, the material being passed therebetween, at least one pair of electrode rollers, said rollers being electrically conductive and rotatably mounted along the material path, between the supply and takeup means, said rollers being disposed to contact opposite ends of a span of material of between about one-fourth inch and about 6 inches; and power supply means coupled to said electrode rollers for completing an electrical circuit through the rollers and span of material, the current through the span being sufficient to increase the temperature to in excess of 2,000° C., and the rate of passage of said material along the span and the length of the span being such that the overall heating time of any given point on the heated span is between about one-fiftieth and 10 seconds.

2. The invention as set forth in claim 1 above, wherein the apparatus includes at least two pairs of electrode rollers successively spaced along the material path, and power supply means for completing an electrical circuit through the span of material through the rollers of each pair, the first span-receiving current sufficient to raise the temperature of the span to between about 400° and 1,900° C., and the second span-receiving current sufficient to heat the span to above about 2,000° C.

3. The invention as set forth in claim 1 above, including in addition means disposed along the material path and in contact with the material for maintaining the material between said rollers under sufficient tension to stretch the material between about 10 and about 50 percent.

4. A system for improving the physical characteristics of a carbonaceous strand having electrically resistive characteristics comprising: strand supply and takeup means; first strand drive means for receiving the strand from the supply means; a pair of electrode rollers receiving the strand from the first drive means, said strand spanning said rollers and having a short span of between about one-fourth inch and 6 inches; means encompassing the pair of rollers for establishing an inert atmosphere thereabout; second strand drive means receiving the strand from the electrode rollers and providing the strand to the takeup means; means disposed along the strand path adjacent the pair of electrode rollers for exerting a substantially constant force on the strand to stretch the strand during heating, and power supply means coupled electrically to said pair of electrode rollers for passing a current through the strand spanning said rollers, sufficient to raise the temperature of the strand in excess of about 2,000° C., the rate of passage and the length of span being such that the span is resistively heated from about one-fiftieth to 10 seconds.

5. The invention as set forth in claim 4 above, including an additional pair of electrode rollers disposed along the strand path, and means for passing an electric current through the span between said rollers, the current passed through the first span along the strand path being sufficient to raise the strand to a temperature of between about 400° and about 1,900° C., and the current passed through the second span along the strand path being sufficient to raise the temperature level to in excess of about 2,000° C.

6. The invention as set forth in claim 4 above, wherein a first strand drive is disposed along the strand path between the supply means and the electrode rollers, and the second drive means is interposed between the electrode rollers and the takeup means, each of said drive means including at least two rotatable members with the strand being wrapped thereabout with a substantial wraparound angle, and means for driving said rollers at a selected speed, and wherein said means for exerting a substantially constant force includes weighted roller means disposed in depending fashion on the strand between said electrode rollers and said second strand drive means.

7. A system for improving the physical characteristics of a carbonaceous strand having resistive electrical characteristics comprising: strand supply and takeup means; a pair of electrode rollers receiving the strand, said strand spanning said rollers and the rollers being spaced to define a span of between one-fourth inch and 6 inches and the rate of passage of said material along the span and the length of the span being such that the overall heating time of any given point on the heat span is between about one-fiftieth and 10 seconds; power supply means electrically coupled to said electrode rollers for passing a current through said strands sufficient to raise the temperature thereof in excess of about 2,000° C.; first and second drive means disposed on opposite sides of said electrode rollers along the strand path, said first and second drive means including means for rotatably driving said drive means at a fixed speed differential, such that a substantially constant stretch is imparted to the strand; and strand takeup means for receiving the strand.

8. The invention as set forth in claim 7 above, wherein in addition a pair of preheat rollers are disposed along the strand path between the supply means and the first drive means, and adjustable current means are coupled to said electrode rollers for passing the current through the strand spanning said preheat rollers, and wherein first and second variable speed control means are coupled to said strand supply and takeup means, respectively, each of said variable speed control means including means for forming a variable length loop takeup, adjustable motor means for driving said strand supply and takeup means, and means for varying the energization of said motor and response to the loop length.

9. The invention as set forth in claim 7 above, wherein said first drive means comprises a first pair of spaced rollers, wherein said second pair of drive means comprises a second pair of spaced rollers, and wherein said system also includes a single motor for said first and second drive means, and belt drive means coupled to said motor and to the first and second drive means to maintain a predetermined speed relationship therebetween.

10. The invention as set forth in claim 9 above, including a variable force mechanism coupled to one of the drive members of said first drive means, and electric brake means selectively actuable to engage said variable force means.

PO-1050
(5/69)

UNITED STATES PATENT OFFICE
CERTIFICATE OF CORRECTION

Patent No. 3,612,819      Dated October 12, 1971

Inventor(s) David W. Gibson

It is certified that error appears in the above-identified patent and that said Letters Patent are hereby corrected as shown below:

Column 4, line 7, after "percent" insert a comma (--,--). Column 5, line 51, "or" should read --of--; line 55, after "method" insert a comma (--,--). Column 6, line 11, "face" should read --fact--; line 58, after "p.s.i." insert a comma (--,--); line 70, after "of" and before "elastic" insert --the--; line 71, after "carried" and before "according" delete "41" and insert --out--. Column 7, line 62, delete this line in its entirety; line 65, after "greater" and before "lesser" insert --or--. Column 8, line 9, "rotatable" should read --rotatably--; line 45, after "materials" delete the comma (",") and insert a period (--.--); line 48, after "40" insert a comma (--,--); line 57, "100-volt" should read --110-volt--. Column 9, line 28, after "material" and before "and" insert a comma (--,--). Column 10, line 62, after "system," delete "except for winding the"; line 63, before "except" delete "main strand 10 through the system,". Column 12, line 1, "108" (second occurrence) should read --109--; line 4, after "105" and before "106" change "and" to --or--; and line 13, "stand" should read --strand--.

Signed and sealed this 11th day of July 1972.

(SEAL)
Attest:

EDWARD M. FLETCHER, JR.
Attesting Officer

ROBERT GOTTSCHALK
Commissioner of Patents